(12) United States Patent
Lukac (10) Patent No.: US 8,035,698 B2
(45) Date of Patent: Oct. 11, 2011

(54) JOINT AUTOMATIC DEMOSAICKING AND WHITE BALANCING

(75) Inventor: Rastislav Lukac, North York (CA)

(73) Assignee: Seiko Epson Corporation, Tokyo (JP)

(*) Notice: Subject to any disclaimer, the term of this patent is extended or adjusted under 35 U.S.C. 154(b) by 450 days.

(21) Appl. No.: 12/357,134

(22) Filed: Jan. 21, 2009

(65) Prior Publication Data
US 2010/0182464 A1 Jul. 22, 2010

(51) Int. Cl.
*H04N 9/73* (2006.01)
*G06K 9/32* (2006.01)

(52) U.S. Cl. .................... 348/223.1; 382/300

(58) Field of Classification Search .............. None
See application file for complete search history.

(56) References Cited

U.S. PATENT DOCUMENTS

| | | | |
|---|---|---|---|
| 5,077,810 A * | 12/1991 | D'Luna | 382/323 |
| 6,069,972 A | 5/2000 | Durg et al. | |
| 6,618,503 B2 | 9/2003 | Hel-or et al. | |
| 6,642,962 B1 | 11/2003 | Lin et al. | |
| 6,747,694 B1 | 6/2004 | Nishikawa et al. | |
| 6,985,170 B1 | 1/2006 | Tsuyuki | |
| 7,102,669 B2 | 9/2006 | Skow | |
| 7,218,344 B2 | 5/2007 | Cooper | |
| 7,236,190 B2 | 6/2007 | Yanof et al. | |
| 7,394,930 B2 * | 7/2008 | Trimeche et al. | 382/167 |
| 7,822,293 B2 * | 10/2010 | Jerdev | 382/300 |
| 7,830,426 B2 * | 11/2010 | Subbotin | 348/272 |
| 7,855,741 B2 * | 12/2010 | Moon et al. | 348/273 |
| 7,889,245 B2 * | 2/2011 | Lukac | 348/223.1 |
| 2002/0167602 A1 | 11/2002 | Nguyen | |
| 2005/0052546 A1 | 3/2005 | Nakabayashi et al. | |
| 2007/0035637 A1 | 2/2007 | Feng et al. | |

FOREIGN PATENT DOCUMENTS

| | | |
|---|---|---|
| JP | 02142294 | 5/1990 |
| JP | 2007087147 | 4/2007 |

* cited by examiner

*Primary Examiner* — Sinh Tran
*Assistant Examiner* — Albert Cutler
(74) *Attorney, Agent, or Firm* — Mark P. Watson (57) ABSTRACT

Joint automatic demosaicking and white balancing. In one example embodiment, a digital image processing method includes several acts. First, directional color correlation signals, global gains, and orientations of edges are calculated in a CFA input image. Next, missing luminance components in CFA chrominance locations are demosaicked along edges in the input image using CFA chrominance components and the directional color correlation signals. Then, the CFA chrominance components are white-balanced using the demosaicked luminance components, the CFA chrominance components, and white-balancing gains expressed as a function of the global gains and local gains calculated directly from a pixel under consideration. Next, missing chrominance components in CFA chrominance locations in the input image are demosaicked. Finally, missing chrominance components in CFA luminance locations in the input image are demosaicked. Performance of these acts results in the transformation of the CFA input image into a full-color white-balanced output image.

24 Claims, 3 Drawing Sheets

JOINT AUTOMATIC DEMOSAICKING AND WHITE BALANCING

BACKGROUND

1. Technical Field

Embodiments of the present invention relate to digital image processing. More specifically, embodiments of the invention relate to methods for joint automatic demosaicking and white balancing of a color filter array (CFA) single-sensor image.

2. Related Art

A digital image is a representation of a two-dimensional analog image as a finite set of pixels. Digital images can be created by a variety of devices, such as digital cameras, scanners, and various other computing devices. Digital image processing is the use of computer algorithms to perform image processing on digital images. Image processing operations include, for example, demosaicking, white balancing, color to grayscale conversion, color adjustment, intensity adjustment, scene analysis, and object recognition. Demosaicking refers to the process of interpolating a full-color digital image from mosaic data received from a CFA internal to many digital cameras. White balancing refers to the process of adjusting the color in a digital image in order to compensate for color shifts due to scene illumination.

In common single-sensor digital camera imaging pipelines, automatic white-balancing solutions are used before or after the demosaicking step to adjust the coloration of the captured visual data in order to compensate for the scene illuminant. Since demosaicking restores the full-color information from the gray-scale CFA sensor readings, the white balancing after demosaicking approach is significantly slower than the white balancing before demosaicking approach when using the same white-balancing solution. On the other hand, white-balancing solutions usually adjust chrominance components (i.e., R and B components of color images in a common Red-Green-Blue format) using luminance components (i.e., G components of color images in a common Red-Green-Blue format). Since in CFA images the pixel locations with available chrominance samples lack the luminance component, which thus has to be estimated prior to adjusting the chrominance component, the white balancing before demosaicking approach may not be as accurate as the white balancing after demosaicking approach when using the same powerful demosaicking solution.

SUMMARY

In general, example embodiments relate to methods for joint automatic demosaicking and white balancing of a digital image.

In a first example embodiment, a digital image processing method includes several acts. First, directional color correlation signals, global gains, and orientations of edges are calculated in a CFA input image. Next, missing luminance components in CFA chrominance locations are demosaicked along edges in the input image using CFA chrominance components and the directional color correlation signals. Then, the CFA chrominance components are white-balanced using the demosaicked luminance components, the CFA chrominance components, and white-balancing gains expressed as a function of the global gains and local gains calculated directly from a pixel under consideration. Next, missing chrominance components in CFA chrominance locations in the input image are demosaicked. Finally, missing chrominance components in CFA luminance locations in the input image are demosaicked. Performance of these acts results in the transformation of the CFA input image into a full-color white-balanced output image.

In a second example embodiment, a digital image processing apparatus includes a calculation module, a luminance component demosaicking module, means for jointly white balancing and demosaicking, and a chrominance-luminance component demosaicking module. The calculation module is configured to calculate directional color correlation signals, global gains, and orientations of edges in a CFA input image. The luminance component demosaicking module is configured to demosaick missing luminance components in CFA chrominance locations along edges in the input image using CFA chrominance components and the directional color correlation signals. The means for means for jointly white balancing and demosaicking is configured white balance the CFA chrominance components and demosaick missing chrominance components in CFA chrominance locations in the input image. The chrominance-luminance component demosaicking module is configured to demosaick missing chrominance components in CFA luminance locations in the input image. The calculation module, the luminance component demosaicking module, the means for jointly white balancing and demosaicking, and the chrominance-luminance component demosaicking module are configured to transform the CFA input image into a full-color white-balanced output image.

In a third example embodiment, one or more computer-readable media have computer-readable instructions thereon which, when executed, implement a digital image processing method, for example, of the sort discussed above in connection with the first example embodiment.

In a fourth example embodiment, a digital image processing apparatus includes a calculation module, a luminance component demosaicking module, a chrominance component white-balancing module, a chrominance-chrominance component demosaicking module, and a chrominance-luminance component demosaicking module. The calculation module is configured to calculate directional color correlation signals, global gains, and orientations of edges in a CFA input image having a Bayer pattern with GRGR phase in odd rows and BGBG phase in even rows. The luminance component demosaicking module is configured to demosaick missing G components in CFA R and B locations along edges in the input image. The chrominance component white-balancing module is configured to white-balance the CFA R and B components using the demosaicked G components, the CFA R and B components, and white-balancing gains expressed as a function of the global gains and local gains calculated directly from a pixel under consideration. The chrominance-chrominance component demosaicking module is configured to demosaick missing R components in CFA B locations in the input image and missing B components in CFA R locations in the input image. The chrominance-luminance component demosaicking module is configured to demosaick missing R and B components in CFA luminance locations in the input image. The calculation, luminance component demosaicking, chrominance component white-balancing, chrominance-chrominance component demosaicking, and chrominance-luminance component demosaicking modules are configured to transform the CFA input image having only one of an R, G, or B component in each pixel into a full-color white-balanced output image having an R, G, and B component in each pixel.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF SOME EXAMPLE EMBODIMENTS

In the following description, reference is made to the accompanying drawings that show, by way of illustration, specific example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods for joint automatic demosaicking and white balancing of a digital image. Example embodiments can be used to automatically produce a visually pleasing full-color white-balanced image from a gray-scale mosaic image received from a CFA internal to a digital camera. Performing the demosaicking and white-balancing operations simultaneously on the CFA data reduces processing errors and increases computational efficiency. In addition, performing these operations simultaneously allows for high-quality white-balanced full-color red-green-blue (RGB) images, making the proposed framework an attractive solution for both digital color imaging devices and image processing software for digital cameras.

I. Example Environment

The example methods and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing apparatuses such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, check scanners, copiers, portable photo viewers (examples of which include, but are not limited to, the Epson P-3000, P-6000, or P-7000 portable photo viewers manufactured by Seiko Epson Corporation), or portable movie players, or some combination thereof, such as a printer/scanner/copier combination, printer/check scanner combination, or a or a digital camera/camcorder combination. An image processing apparatus may include joint automatic demosaicking and white-balancing capability, for example, to automatically demosaick and white balance a CFA image in order to automatically generate a full-color white-balanced image. For example, a camera with this joint automatic demosaicking and white-balancing capability may include one or more computer-readable media that implement the example methods disclosed herein, or a computer connected to the camera may include one or more computer-readable media that implement the example methods disclosed herein.

Figure 1:
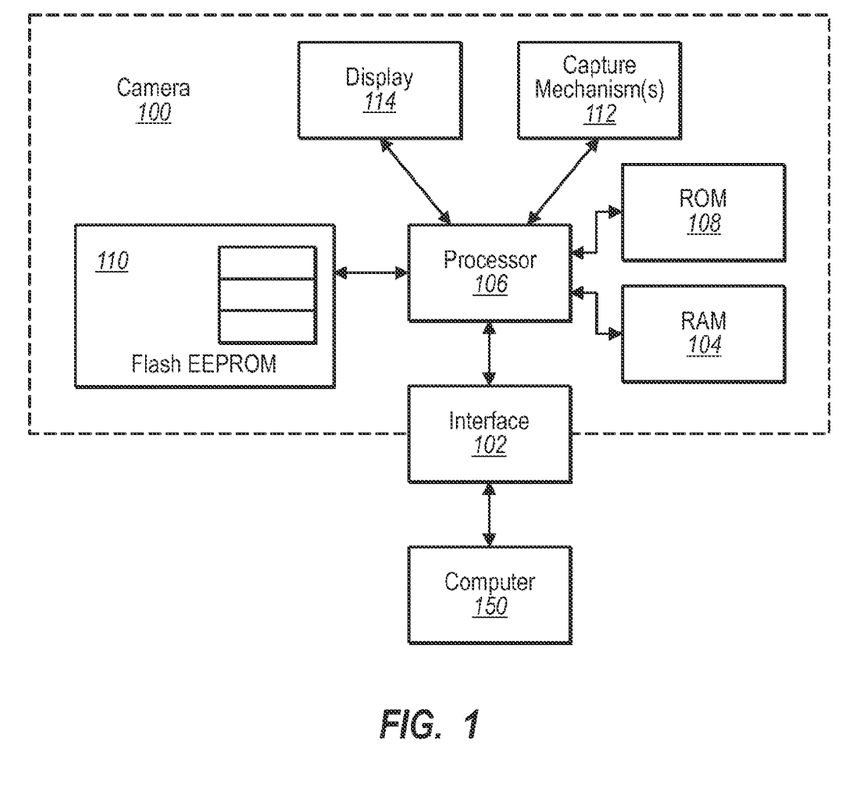
FIG. 1 is a schematic representation of an example camera.

A schematic representation of an example camera 100 is disclosed in FIG. 1. The example camera 100 exchanges data with a host computer 150 by way of an intervening interface 102. Application programs and a camera driver may also be stored for access on the host computer 150. When an image retrieve command is received from the application program, for example, the camera driver controls conversion of the command data to a format suitable for the camera 100 and sends the converted command data to the camera 100. The driver also receives and interprets various signals and data from the camera 100, and provides necessary information to the user by way of the host computer 150.

When data is sent by the host computer 150, the interface 102 receives the data and stores it in a receive buffer forming part of a RAM 104. The RAM 104 can be divided into a number of sections, for example through addressing, and allocated as different buffers, such as a receive buffer or a send buffer. Data, such as digital image data, can also be obtained by the camera 100 from the capture mechanism(s) 112. For example, the capture mechanism(s) 112 may be a CFA-equipped sensor capable of generating a mosaic-like image of color visual data corresponding to a real-world scene. This so-called CFA image can then be stored in the receive buffer or the send buffer of the RAM 104.

A processor 106 uses computer-executable instructions stored on a ROM 108 or on a flash EEPROM 110, for example, to perform a certain function or group of functions, such as the example methods for joint automatic demosaicking and white balancing disclosed herein. Where the data in the receive buffer of the RAM 104 is a CFA image, for example, the processor 106 can implement the methodological acts of the example methods for joint automatic demosaicking and white balancing on the CFA image in order to automatically generate a full-color white-balanced image. Further processing in an imaging pipeline may then be performed on the full-color white-balanced image before being displayed by the camera 100 on a display 114, such as an LCD display for example, or transferred to the host computer 150, for example.

It is understood that CFA images may be received by the camera 100 from sources other than the computer 150 and the capture mechanism(s) 112, including, but not limited to, the flash EEPROM 110 or the ROM 108. Example embodiments of the camera 100 include, but are not limited to, the Epson R-D1 Digital Camera manufactured by Seiko Epson Corporation.

II. Example Method

Figure 2:
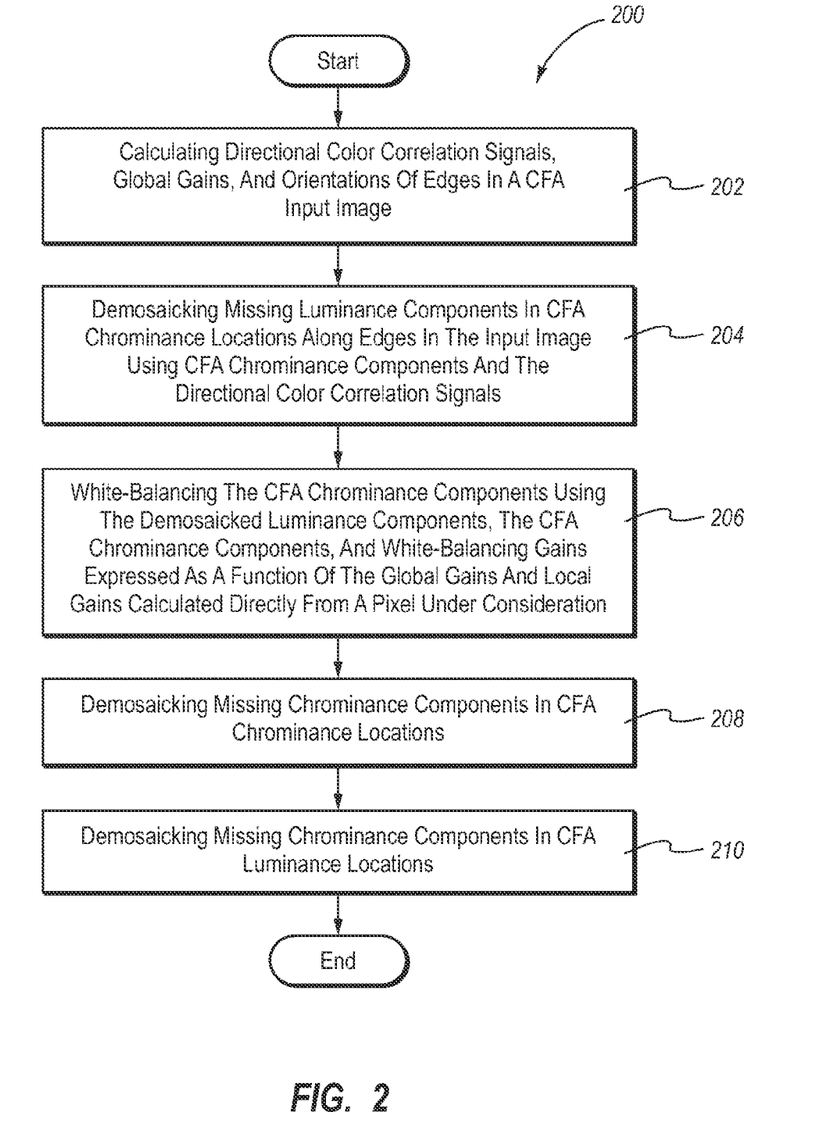
FIG. 2 is a flowchart of an example method for joint automatic demosaicking and white balancing of a digital image.

FIG. 2 is a flowchart of an example method 200 for joint automatic demosaicking and white balancing of a digital image. The example method 200 will now be discussed in connection with FIG. 2. Prior to performing the method 200, an input color filter array (CFA) image can be targeted for demosaicking and white balancing in order to produce a full-color white-balanced output image.

At 202, directional color correlation signals, global gains, and orientations of edges are calculated in the input image. At 204, missing luminance components in CFA chrominance locations are demosaicked along edges in the input image using CFA chrominance components and the directional color correlation signals. At 206, the CFA chrominance components are white-balanced using the demosaicked luminance components, the CFA chrominance components, and white-balancing gains expressed as a function of the global gains and local gains calculated directly from a pixel under consideration. At 208, missing chrominance components in CFA chrominance locations in the input image are demosaicked. Then, at 210, missing chrominance components in CFA luminance locations in the input image are demosaicked.

Performing the demosaicking and white-balancing operations simultaneously on the CFA image reduces processing errors and increases computational efficiency. In addition, it allows for high-quality white-balanced full-color RGB images, making the example method 200 an attractive solution for both digital color imaging devices and image processing software for digital cameras.

III. Example Implementation of the Example Method

Figure 3:
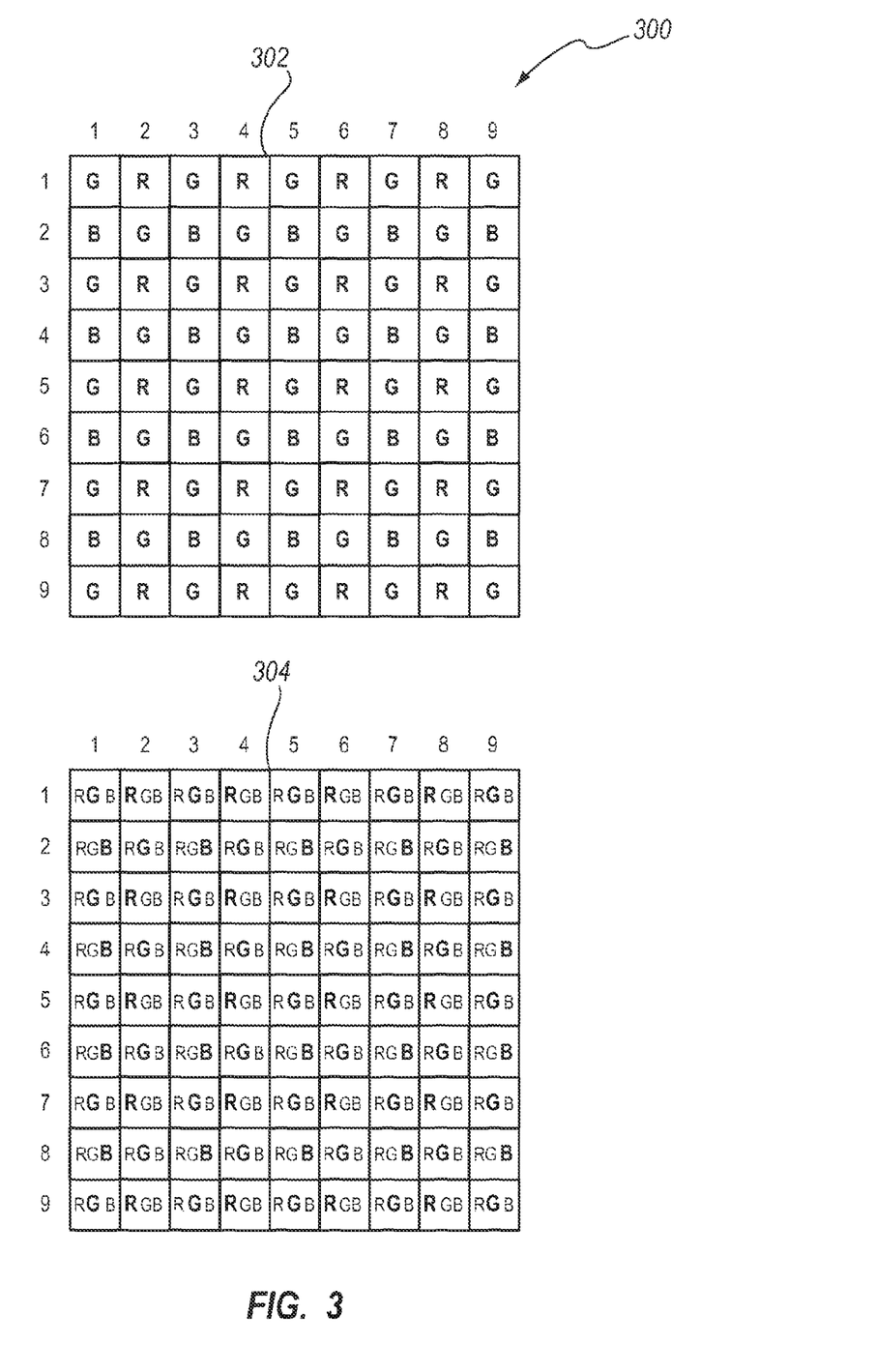
FIG. 3 is an example implementation of the example method of FIG. 2.

FIG. 3 is an example implementation 300 of the example method 200 of FIG. 2. The example implementation 300 of the example method 200 will now be disclosed in connection with FIG. 3. As disclosed in FIG. 3, the example implementation 300 receives as input a CFA image 302 and generates a full-color white-balanced output image 304. Although the input image 302 and the output image 304 each include only 9 rows and 9 columns of pixels, it is understood that the example method 200 can be performed on an input image having a greater or lesser number of rows and/or columns, resulting in an output image having a greater or lesser number of rows and/or columns.

As disclosed in FIG. 3, the example implementation 300 operates directly on the CFA image 302 before this image has been demosaicked into the full-color image or adjusted to generate its white-balanced version. Since a conventional image sensor is essentially a monochrome device, each sensor cell has its own color filter to acquire visual information. In typical CFA sensor configurations, each sensor cell or pixel location of the acquired image corresponds to the red (R), green (G), or blue (B) color filter in the CFA. The CFA image 302 thus constitutes a gray-scale mosaic-like image z with pixels $z_{(r,s)}$. The arrangement of color filters in CFA images varies among camera manufacturers. One example arrangement is the Bayer pattern with GRGR phase in odd rows and BGBG phase in even rows. In the CFA image 302 with $K_1$ rows and $K_2$ columns where r=1, 2, . . . , $K_1$ and s=1, 2, . . . , $K_2$ denote, respectively, the image row and column, $z_{(r,s)}$ corresponds to the R components for (odd r, even s), the G components for (odd r, odd s) and (even r, even s), and the B components for (even r, odd s). Note that the G components are often referred to as luminance signals, whereas the R and B components are often referred to as chrominance signals. Although the following description of the example implementation 300 is disclosed in connection with the Bayer CFA presented above, the extension of the example method 200 to other CFA arrangements is straightforward and contemplated.

With continued reference to FIGS. 2 and 3, at 202, the directional color correlation signals, global gains, and the orientation of edges are calculated in the input image 302. The purpose of the preprocessing calculations at 202 is to obtain information for guiding the subsequent joint demosaicking and white-balancing process.

The performance of demosaicking algorithms critically depends on their ability to follow both the spectral (i.e. color) and structural (i.e. edge) characteristics of the captured image in order to avoid color artifacts and edge blur. This ability usually corresponds to the formation of the directional color correlation signals $\delta(z)$ from the CFA luminance and chrominance values along the dominant edge direction. The $\delta(z)$ signal is the function of the CFA image z and consists of the samples $\delta_{(r,s)}$. More specifically, the directional color correlation signal $\delta_{(r,s)}$ may be obtained according to the following formula:

$$\delta_{(r,s)} = f_\Lambda^\Omega(z,(r,s))$$

where:
Λ denotes the spectral correlation operator characterizing the relation between the luminance and chrominance components, and
Ω denotes the edge orientation operator.

In some example embodiments, the relation between the luminance and chrominance components denoted by Λ is subtraction or division. For example, in case of subtraction $\Lambda(a_1, a_2) = a_1 - a_2$. In most demosaicking solutions, Ω-based edge orientation estimates are obtained by maximizing certain local similarity criterion defined on CFA samples in some spatial direction (usually vertical, horizontal, and two diagonal directions) and Λ-based color-correlation signals are usually formed as the luminance-chrominance differences; as both these approaches are relatively easy to implement.

A simple way to generate the directional color correlation signal δ(z) with samples $\delta_{(r,s)}$ is as follows:

$$\delta_{(r,s)} = \begin{cases} c(z_{(r,s)} - (z_{(r-1,s)} + z_{(r+1,s)})/2) & \text{for } |z_{(r-1,s)} - z_{(r+1,s)}| \leq |z_{(r,s-1)} - z_{(r,s+1)}| \\ c(z_{(r,s)} - (z_{(r,s-1)} + z_{(r,s+1)})/2) & \text{otherwise} \end{cases} \quad (2)$$

where:
  c=1 for CFA luminance locations (odd r, odd s) and (even r, even s), and
  c=−1 for CFA chrominance locations (odd r, even s) and (even r, odd s).

In the formulae above, the comparison of the absolute difference $|z_{(r-1,s)} - z_{(r+1,s)}|$ between the CFA data of pixels above and below the pixel location (r,s) and the absolute difference $|z_{(r,s-1)} - z_{(r,s+1)}|$ between data of pixels on the left and on the right of the pixel location (r,s) are used to determine the orientation of an edge in the pixel location (r,s) under consideration. As shown in FIG. 3, the CFA samples used in each of the above absolute differences correspond to the same color component in order to allow for meaningful detection of signal variances. The smaller of these two absolute differences determines the direction along which demosaicking should be performed in order to reduce possible processing errors. As can be seen from the above discussion, only two directions are considered in this embodiment although four or more directions are also possible at expense of increased computational complexity. It should be also understood that more sophisticated formulae can be used instead of the example formulae to determine the orientation of edges in the image.

Automatic white-balancing solutions rely on the spectral characteristics to set the parameters (gains) of a white-balancing process in order to produce images with visually pleasing colors. Due to the mosaic nature of the CFA image, the gain values $\alpha_{(r,s)}$ can be obtained using the global spectral characteristics of the CFA image z as follows:

$$\alpha_{(r,s)} = \begin{cases} \Phi(\bar{G}, \bar{R}) & \text{for (odd } r, \text{ even } s) \\ \Phi(\bar{G}, \bar{B}) & \text{for (even } r, \text{ odd } s) \\ \Phi(\bar{G}, \bar{G}) & \text{otherwise} \end{cases} \quad (3)$$

where:
  Φ is the operator denoting the relationship between the two inputs of the gain function Φ(•,•); usually implemented as the division of the inputs,
  $\bar{G}$ is the mean of $z_{(r,s)}$ entries located in (odd r, odd s) and (even r, even s),
  $\bar{R}$ is the mean of $z_{(r,s)}$ entries located in (odd r, even s), and
  $\bar{B}$ is the mean of $z_{(r,s)}$ entries located in (even r, odd s).

Alternatively, $\bar{R}$, $\bar{G}$, and $\bar{B}$ can be calculated using selected pixels; for example, pixels from the areas with white-like colors or achromatic colors. It should be understood that the example embodiments are not limited to a specific form of the Φ(•,•) function, as the proposed methods also support other possible implementations of the Φ(•,•) function.

After the values of $\bar{R}$, $\bar{G}$ and $\bar{B}$ are achieved using one of the procedures listed below Equation (3), then following the standard formulation of the white-balancing problem the global gain values can be expressed as $\alpha_{(r,s)} = \bar{G}/\bar{R}$ for (odd r, even s), $\alpha_{(r,s)} = \bar{G}/\bar{B}$ for (even r, odd s), and $\alpha_{(r,s)} = 1$ for (odd r, odd s) and (even r, even s).

After the preprocessing calculations of act 202 are completed, the framework can perform the actual demosaicking and white-balancing operations in order to transform the CFA image 302 into a demosaicked, full-color white-balanced output image 304. The pixels $x_{(r,s)} = [x_{(r,s)1}, x_{(r,s)2}, x_{(r,s)3}]$ of this demosaicked, white-balanced full-color image consist of $x_{(r,s)1}$, $x_{(r,s)2}$, and $x_{(r,s)3}$ components which denote the R, G, and B component, respectively. In practice, automatic white-balancing solutions usually use luminance components to adjust chrominance components while keeping luminance components unchanged. For this reason, at 204, the luminance components in CFA chrominance locations (R and B locations of the input image 302) are demosaicked along edges in the input image 302 using the CFA chrominance components (R and B locations of the input image 302) and the directional color correlation signals δ(z). Since pixels of the CFA data lack the luminance component in chrominance locations, joint demosaicking and white-balancing operations of acts 206 and 208 should be realized as follows:

$$x_{(r,s)2} = \Lambda^{-1}(z_{(r,s)}, \delta_{(r,s)}) \quad (4)$$

$$x_{(r,s)k} = \begin{cases} \Phi^{-1}(z_{(r,s)}, f(\alpha_{(r,s)}, \beta_{(r,s)})) & \begin{cases} k = 1 \text{ for (odd } r, \text{ even } s); \\ k = 3 \text{ for (even } r, \text{ odd } s); \end{cases} \\ \Lambda^{-1}\left(x_{(r,s)2}, \frac{1}{|\zeta|} \sum_{(i,j) \in \zeta} \Lambda^\Omega(x_{(i,j)k}, x_{(i,j)2})\right) & \begin{cases} k = 3 \text{ for (odd } r, \text{ even } s); \\ k = 1 \text{ for (even } r, \text{ odd } s) \end{cases} \end{cases}$$

where:
  ζ is a set of pixel locations inside the localized neighborhood,
  $\Lambda^{-1}$ is an operator inverse to Λ in Equation (1); for example, the subtractive Λ calls for an additive $\Lambda^{-1}$,
  $\Phi^{-1}$ performs inverse operation to Φ from Equation (2), for example, the rational Φ calls for a multiplicative $\Phi^{-1}$,
  $f(\bullet)$ denotes the function of the global gain $\alpha_{(r,s)}$ from Equation (2), and the local gain $\beta_{(r,s)}$ defined using the demosaicked luminance component $x_{(r,s)2}$ from Equation (4) as follows:

$$\beta_{(r,s)} = \begin{cases} \Phi(z_{(r,s)}, x_{(r,s)2}) & \text{for (odd } r, \text{ even } s) \text{ and (even } r, \text{ odd } s) \\ \Phi(x_{(r,s)2}, x_{(r,s)2}) & \text{otherwise} \end{cases} \quad (5)$$

The function $f(\bullet)$ can have various forms. For example, some functions $f(\bullet)$ can be realized as the weighted average of $\alpha_{(r,s)}$ and $\beta_{(r,s)}$.

Performing Equation (4) in all CFA chrominance locations (odd r, even s) and (even r, odd s) produces demosaicked white-balanced full-color pixels $x_{(r,s)}$. However, this is not the case in the CFA luminance locations (odd r, odd s) and (even r, even s), where only the luminance component is available. Therefore, to complete the joint demosaicking and white-balancing process, the procedure of act 210 should continue as follows:

$$x_{(r,s)k} = \Lambda^{-1}\left(x_{(r,s)2}, \frac{1}{|\zeta|} \sum_{(i,j) \in \zeta} \Lambda^\Omega(x_{(i,j)k}, x_{(i,j)2})\right) \quad (6)$$

for $k = 1$ and $k = 3$

More specifically, since in this embodiment Equation (2) forms the color correlation signals $\delta_{(r,s)}$ as differences between CFA luminance and chrominance components and the global gains are calculated as ratios of the luminance and chrominance values, $x_{(r,s)2}$ may be demosaicked and then used to obtain the white-balanced chrominance samples $x_{(r,s)1}$ and $x_{(r,s)3}$ as follows:

$$x_{(r,s)2} = z_{(r,s)} + \delta_{(r,s)} \text{ for (odd } r, \text{ even } s) \text{ and (even } r, \text{ odd } s)$$

$$x_{(r,s)1} = z_{(r,s)}(w_1 x_{(r,s)2}/z_{(r,s)} + w_2 \overline{G}/\overline{R})/(w_1+w_2) \text{ for (odd } r, \text{ even } s)$$

$$x_{(r,s)3} = z_{(r,s)}(w_1 x_{(r,s)2}/z_{(r,s)} + w_2 \overline{G}/\overline{R})/(w_1+w_2) \text{ for (even } r, \text{ odd } s) \quad (7)$$

In Equation (7), $\delta_{(r,s)}$ and $f(\bullet)$ from Equation (4) are expressed as $\beta_{(r,s)} = x_{(r,s)2}/z_{(r,s)}$ and $f(\alpha_{(r,s)}, \beta_{(r,s)}) = (w_1 \beta_{(r,s)} + w_2 \alpha_{(r,s)})/(w_1+w_2)$ where the terms $w_1$ and $w_2$ are the weights used to control the contribution of the local and global white-balancing terms to the total gain. It should be emphasized here that using the actual demosaicked luminance component to adjust the acquired chrominance components in the white-balancing process in Equation (7) greatly minimizes the processing errors and enhances the efficiency of the joint white-balancing and demosaicking process.

Using the last expression from Equation (4), the white balanced chrominance (R and B) components can be obtained in chrominance (B and R, respectively) CFA locations as follows:

$$x_{(r,s)k} = x_{(r,s)2} + \frac{1}{|\zeta|} \sum_{(i,j) \in \zeta} (x_{(i,j)k} - x_{(i,j)2}) \quad (8)$$

where $\zeta = \{(r-1,s-1),(r-1,s+1),(r+1,s-1),(r+1,s+1)\}$, thus implying $|\zeta|=4$. The value of k should be set as k=1 for (even r, odd s) and k=3 for (odd r, even s).

Since available R and B components are now located in the CFA chrominance locations (odd r, even s) and (even r, odd s), they can be used to produce demosaicked white balanced chrominance components in CFA luminance locations (odd r, odd s) and (even r, even s) using Equation (8) with $\zeta = \{(r-1,s),(r+1,s)\}$ for $|z_{(r-1,s)} - z_{(r+1,s)}| \leq |z_{(r,s-1)} - z_{(r,s+1)}|$ and $\zeta = \{(r,s-1),(r,s+1)\}$ for $|z_{(r-1,s)} - z_{(r+1,s)}| < |z_{(r,s-1)} - z_{(r,s+1)}|$, thus implying in both cases $|\zeta|=2$. The comparison of $|z_{(r-1,s)} - z_{(r+1,s)}|$ and $|z_{(r,s-1)} - z_{(r,s+1)}|$ constitutes the edge-orientation operator from Equation (2) which is now employed to ensure consistency in luminance and chrominance estimates. Performing Equation (8) with the above edge-sensing procedure in all CFA luminance locations completes the joint demosaicking and white-balancing process, thus producing the restored full-color output image 304 with an adjusted coloration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A digital image processing method comprising the acts of:
   a) calculating directional color correlation signals, global gains, and orientations of edges in a color filter array (CFA) input image;
   b) demosaicking missing luminance components in CFA chrominance locations along edges in the input image using CFA chrominance components and the directional color correlation signals;
   c) white balancing the CFA chrominance components using the demosaicked luminance components, the CFA chrominance components, and white-balancing gains expressed as a function of the global gains and local gains calculated directly from a pixel under consideration;
   d) demosaicking missing chrominance components in CFA chrominance locations in the input image; and
   e) demosaicking missing chrominance components in CFA luminance locations in the input image,
   wherein performance of the acts a), b), c), d), and e) results in the transformation of the CFA input image into a full-color white-balanced output image.

2. The method as recited in claim 1, wherein the global gains $\alpha$ are obtained according to the following equation:

$$\alpha_{(r,s)} = \begin{cases} \Phi(\overline{G}, \overline{R}) & \text{for (odd } r, \text{ even } s) \\ \Phi(\overline{G}, \overline{B}) & \text{for (even } r, \text{ odd } s) \\ \Phi(\overline{G}, \overline{G}) & \text{otherwise} \end{cases}$$

where:
   z is the input image with pixels $z_{(r,s)}$,
   r=1, 2, . . . , $K_1$ and s=1, 2, . . . , $K_2$ denote, respectively, a row and a column of the input image with $K_1$ rows and $K_2$ columns,
   $\Phi$ is an operator denoting a relationship between two inputs of a gain function $\Phi(\bullet,\bullet)$,
   $\overline{G}$ is the mean of $z_{(r,s)}$ entries located in (odd r, odd s) and (even r, even s) or is a function of pixels from areas of the input image with white-like colors or achromatic colors,
   $\overline{R}$ is the mean of $z_{(r,s)}$ entries located in (odd r, even s) or is a function of pixels from areas of the input image with white-like colors or achromatic colors, and
   $\overline{B}$ is the mean of $z_{(r,s)}$ entries located in (even r, odd s) or is a function of pixels from areas of the input image with white-like colors or achromatic colors.

3. The method as recited in claim 2, wherein the directional color correlation signals $\delta$ are obtained according to the following equation:

$$\delta_{(r,s)} = f_\Lambda^\Omega(z,(r,s))$$

where:
   $\Lambda$ denotes a spectral correlation operator characterizing a relation between luminance and chrominance components, and
   $\Omega$ denotes an edge orientation operator.

4. The method as recited in claim 3, wherein the acts b), c), and d) are performed according to the following equations:

$$x_{(r,s)2} = \Lambda^{-1}(z_{(r,s)}, \delta_{(r,s)})$$

$$x_{(r,s)k} = \begin{cases} \Phi^{-1}(z_{(r,s)}, f(\alpha_{(r,s)}, \beta_{(r,s)})) & \begin{cases} k=1 \text{ for (odd } r, \text{ even } s); \\ k=3 \text{ for (even } r, \text{ odd } s); \end{cases} \\ \Lambda^{-1}\left(x_{(r,s)2}, \frac{1}{|\zeta|} \sum_{(i,j) \in \zeta} \Lambda^\Omega(x_{(i,j)k}, x_{(i,j)2})\right) & \begin{cases} k=3 \text{ for (odd } r, \text{ even } s); \\ k=1 \text{ for (even } r, \text{ odd } s) \end{cases} \end{cases}$$

where:
x is the output image with pixels $x_{(r,s)}$,
$\zeta$ is a set of pixel locations inside a localized neighborhood,
$\Lambda^1$ is an operator inverse to $\Lambda$,
$\Phi^1$ performs inverse operation to $\Phi$,
$f(\bullet)$ denotes a function of the global gain $\alpha_{(r,s)}$ and the local gain $\beta_{(r,s)}$ defined as follows:

$$\beta_{(r,s)} = \begin{cases} \Phi(z_{(r,s)}, x_{(r,s)2}) & \text{for (odd } r\text{, even } s\text{) and (even } r\text{, odd } s\text{)} \\ \Phi(x_{(r,s)2}, x_{(r,s)2}) & \text{otherwise.} \end{cases}$$

5. The method as recited in claim 4, wherein the act e) is performed according to the following equation:

$$x_{(r,s)k} = \Lambda^{-1}\left(x_{(r,s)2}, \frac{1}{|\zeta|}\sum_{(i,j)\in\zeta}\Lambda^\Omega(x_{(i,j)k}, x_{(i,j)2})\right)$$

for k=1 and k=3, and (odd r, odd s) and (even r, even s).

6. The method as recited in claim 2, wherein the directional color correlation signals $\delta$ are obtained according to the following equation:

$$\delta_{(r,s)} = \begin{cases} c(z_{(r,s)} - (z_{(r-1,s)} + z_{(r+1,s)})/2) & \text{for } |z_{(r-1,s)} - z_{(r+1,s)}| \leq |z_{(r,s-1)} - z_{(r,s+1)}| \\ c(z_{(r,s)} - (z_{(r,s-1)} + z_{(r,s+1)})/2) & \text{otherwise} \end{cases}$$

where:
c=1 for CFA luminance locations (odd r, odd s) and (even r, even s), and
c=−1 for CFA chrominance locations (odd r, even s) and (even r, odd s).

7. The method as recited in claim 6, wherein the acts b), c), and d) are performed according to the following equations:

$x_{(r,s)2} = z_{(r,s)} + \delta_{(r,s)}$ for (odd r, even s) and (even r, odd s)

$x_{(r,s)1} = z_{(r,s)}(w_1 x_{(r,s)2}/z_{(r,s)} + w_2 \overline{G}/\overline{R})/(w_1+w_2)$ for (odd r, even s)

$x_{(r,s)3} = z_{(r,s)}(w_1 x_{(r,s)2}/z_{(r,s)} + w_2 \overline{G}/\overline{R})/(w_1+w_2)$ for (even r, odd s)

where:
x is the output image with pixels $x_{(r,s)}$,
$w_1$ and $w_2$ are weights used to control contributions of local and global white-balancing terms to a total gain.

8. A digital image processing apparatus comprising:
a calculation module configured to calculate directional color correlation signals, global gains, and orientations of edges in a CFA input image;
a luminance component demosaicking module configured to demosaick missing luminance components in CFA chrominance locations along edges in the input image using CFA chrominance components and the directional color correlation signals;
a chrominance component white-balancing module configured to white-balance the CFA chrominance components using the demosaicked luminance components, the CFA chrominance components, and white-balancing gains expressed as a function of the global gains and local gains calculated directly from a pixel under consideration;
a chrominance-chrominance component demosaicking module configured to demosaick missing chrominance components in CFA chrominance locations in the input image; and
a chrominance-luminance component demosaicking module configured to demosaick missing chrominance components in CFA luminance locations in the input image,
wherein the calculation module, the luminance component demosaicking module, the means for jointly white balancing and demosaicking, and the chrominance-luminance component demosaicking module are configured to transform the CFA input image into a full-color white-balanced output image.

9. The apparatus as recited in claim 8, wherein the global gains $\alpha$ are obtained according to the following equation:

$$\alpha_{(r,s)} = \begin{cases} \Phi(\overline{G}, \overline{R}) & \text{for (odd } r\text{, even } s\text{)} \\ \Phi(\overline{G}, \overline{B}) & \text{for (even } r\text{, odd } s\text{)} \\ \Phi(\overline{G}, \overline{G}) & \text{otherwise} \end{cases}$$

where:
z is the input image with pixels $z_{(r,s)}$,
r=1, 2, ..., $K_1$ and s=1, 2, ..., $K_2$ denote, respectively, the row and column of the input image with $K_1$ rows and $K_2$ columns,
$\Phi$ is an operator denoting the relationship between the two inputs of a gain function $\Phi(\bullet,\bullet)$,
$\overline{G}$ is the mean of $z_{(r,s)}$ entries located in (odd r, odd s) and (even r, even s) or is a function of pixels from areas of the input image with white-like colors or achromatic colors,
$\overline{R}$ is the mean of $z_{(r,s)}$ entries located in (odd r, even s) or is a function of pixels from areas of the input image with white-like colors or achromatic colors, and
$\overline{B}$ is the mean of $z_{(r,s)}$ entries located in (even r, odd s) or is a function of pixels from areas of the input image with white-like colors or achromatic colors.

10. The apparatus as recited in claim 9, wherein the directional color correlation signals $\delta$ are obtained according to the following equation:

$$\delta_{(r,s)} = f_\Lambda^\Omega(z,(r,s))$$

where:
$\Lambda$ denotes the spectral correlation operator characterizing the relation between the luminance and chrominance components, and
$\Omega$ denotes the edge orientation operator.

11. The apparatus as recited in claim 10, wherein the luminance component demosaicking module, chrominance component white-balancing module, and the chrominance-chrominance component demosaicking module are configured to demosaick and white-balance according to the following equations:

$$x_{(r,s)2} = \Lambda^{-1}(z_{(r,s)}, \delta_{(r,s)})$$

$$x_{(r,s)k} = \begin{cases} \Phi^{-1}(z_{(r,s)}, f(\alpha_{(r,s)}, \beta_{(r,s)})) & \begin{cases} k=1 \text{ for (odd } r\text{, even } s\text{);} \\ k=3 \text{ for (even } r\text{, odd } s\text{);} \end{cases} \\ \Lambda^{-1}\left(x_{(r,s)2}, \frac{1}{|\zeta|}\sum_{(i,j)\in\zeta}\Lambda^\Omega(x_{(i,j)k}, x_{(i,j)2})\right) & \begin{cases} k=3 \text{ for (odd } r\text{, even } s\text{);} \\ k=1 \text{ for (even } r\text{, odd } s\text{)} \end{cases} \end{cases}$$

where:
is the output image with pixels $x_{(r,s)}$,
ζ is a set of pixel locations inside the localized neighborhood,
$\Lambda^{-1}$ is an operator inverse to $\Lambda$,
$\Phi^-$ performs inverse operation to $\Phi$,
$f(\bullet)$ denotes a function of the global gain $\alpha_{(r,s)}$ and the local gain $\beta_{(r,s)}$ defined as follows:

$$\beta_{(r,s)} = \begin{cases} \Phi(z_{(r,s)}, x_{(r,s)2}) & \text{for (odd } r\text{, even } s\text{) and (even } r\text{, odd } s\text{)} \\ \Phi(x_{(r,s)2}, x_{(r,s)2}) & \text{otherwise.} \end{cases}$$

12. The apparatus as recited in claim 11, wherein the chrominance-luminance component demosaicking module is configured to demosaicking according to the following equation:

$$x_{(r,s)k} = \Lambda^{-1}\left(x_{(r,s)2}, \frac{1}{|\zeta|}\sum_{(i,j)\in\zeta}\Lambda^\Omega(x_{(i,j)k}, x_{(i,j)2})\right)$$

for k=1 and k=3, and (odd r, odd s) and (even r, even s).

13. The apparatus as recited in claim 9, wherein the directional color correlation signals δ are obtained according to the following equation:

$$\delta_{(r,s)} = \begin{cases} c(z_{(r,s)} - (z_{(r-1,s)} + z_{(r+1,s)})/2) & \text{for } |z_{(r-1,s)} - z_{(r+1,s)}| \le |z_{(r,s-1)} - z_{(r,s+1)}| \\ c(z_{(r,s)} - (z_{(r,s-1)} + z_{(r,s+1)})/2) & \text{otherwise} \end{cases}$$

where:
c=1 for CFA luminance locations (odd r, odd s) and (even r, even s), and
c=−1 for CFA chrominance locations (odd r, even s) and (even r, odd s).

14. The apparatus as recited in claim 13, wherein the luminance component demosaicking module, chrominance component white-balancing module, and the chrominance-chrominance component demosaicking module are configured to demosaick and white-balance according to the following equations:

$x_{(r,s)2} = z_{(r,s)} + \delta_{(r,s)}$ for (odd $r$, even $s$) and (even $r$, odd $s$)

$x_{(r,s)1} = z_{(r,s)}(w_1 x_{(r,s)2}/z_{(r,s)} + w_2 \overline{G}/\overline{R})/(w_1+w_2)$ for (odd $r$, even $s$)

$x_{(r,s)3} = z_{(r,s)}(w_1 x_{(r,s)2}/z_{(r,s)} + w_2 \overline{G}/\overline{R})/(w_1+w_2)$ for (even $r$, odd $s$)

where:
x is the output image with pixels $x_{(r,s)}$,
$w_1$ and $w_2$ are weights used to control contributions of local and global white-balancing terms to a total gain.

15. The apparatus as recited in claim 8, wherein the apparatus comprises a digital camera.

16. One or more non-transitory computer-readable media having computer-readable instructions thereon which, when executed, implement a digital image processing method comprising the acts of:
a) calculating directional color correlation signals, global gains, and orientations of edges in a CFA input image;
b) demosaicking missing luminance components in CFA chrominance locations along edges in the input image using CFA chrominance components and the directional color correlation signals;
c) white balancing the CFA chrominance components using the demosaicked luminance components, the CFA chrominance components, and white-balancing gains expressed as a function of the global gains and local gains calculated directly from a pixel under consideration;
d) demosaicking missing chrominance components in CFA chrominance locations in the input image; and
e) demosaicking missing chrominance components in CFA luminance locations in the input image,
wherein performance of the acts a), b), c), d), and e) results in the transformation of the CFA input image into a full-color white-balanced output image.

17. The one or more computer-readable media as recited in claim 16, wherein the global gains α are obtained according to the following equation:

$$\alpha_{(r,s)} = \begin{cases} \Phi(\overline{G}, \overline{R}) & \text{for (odd } r\text{, even } s\text{)} \\ \Phi(\overline{G}, \overline{B}) & \text{for (even } r\text{, odd } s\text{)} \\ \Phi(\overline{G}, \overline{G}) & \text{otherwise} \end{cases}$$

where:
z is the input image with pixels $z_{(r,s)}$,
r=1, 2, ..., $K_1$ and s=1, 2, ..., $K_2$ denote, respectively, the row and column of the input image with $K_1$ rows and $K_2$ columns,
$\Phi$ is an operator denoting the relationship between the two inputs of a gain function $\Phi(\bullet,\bullet)$,
$\overline{G}$ is the mean of $z_{(r,s)}$ entries located in (odd r, odd s) and (even r, even s) or is a function of pixels from areas of the input image with white-like colors or achromatic colors,
$\overline{R}$ is the mean of $z_{(r,s)}$ entries located in (odd r, even s) or is a function of pixels from areas of the input image with white-like colors or achromatic colors, and
$\overline{B}$ is the mean of $z_{(r,s)}$ entries located in (even r, odd s) or is a function of pixels from areas of the input image with white-like colors or achromatic colors.

18. The one or more computer-readable media as recited in claim 17, wherein the directional color correlation signals δ are obtained according to the following equation:

$$\delta_{(r,s)} = f_\Lambda^\Omega(z,(r,s))$$

where:
$\Lambda$ denotes the spectral correlation operator characterizing the relation between the luminance and chrominance components, and
$\Omega$ denotes the edge orientation operator.

19. The one or more computer-readable media as recited in claim 18, wherein the acts b), c), and d) are performed according to the following equations:

$$x_{(r,s)2} = \Lambda^{-1}(z_{(r,s)}, \delta_{(r,s)})$$

$$x_{(r,s)k} = \begin{cases} \Phi^{-1}(z_{(r,s)}, f(\alpha_{(r,s)}, \beta_{(r,s)})) & \begin{cases} k=1 \text{ for (odd } r\text{, even } s\text{);} \\ k=3 \text{ for (even } r\text{, odd } s\text{);} \end{cases} \\ \Lambda^{-1}\left(x_{(r,s)2}, \frac{1}{|\zeta|}\sum_{(i,j)\in\zeta}\Lambda^\Omega(x_{(i,j)k}, x_{(i,j)2})\right) & \begin{cases} k=3 \text{ for (odd } r\text{, even } s\text{);} \\ k=1 \text{ for (even } r\text{, odd } s\text{)} \end{cases} \end{cases}$$

where:
x is the output image with pixels $x_{(r,s)}$,
ζ is a set of pixel locations inside the localized neighborhood,
$\Lambda^1$ is an operator inverse to $\Lambda$, $\Phi^1$ performs inverse operation to $\Phi$, $f(\bullet)$ denotes a function of the global gain $\alpha_{(r,s)}$ and the local gain $\beta_{(r,s)}$ defined as follows:

$$\beta_{(r,s)} = \begin{cases} \Phi(z_{(r,s)}, x_{(r,s)2}) & \text{for (odd } r\text{, even } s\text{) and (even } r\text{, odd } s\text{)} \\ \Phi(x_{(r,s)2}, x_{(r,s)2}) & \text{otherwise.} \end{cases}$$

20. The one or more computer-readable media as recited in claim 19, wherein the act e) is performed according to the following equation:

$$x_{(r,s)k} = \Lambda^{-1}\left(x_{(r,s)2}, \frac{1}{|\zeta|} \sum_{(i,j) \in \zeta} \Lambda^{\Omega}(x_{(i,j)k}, x_{(i,j)2})\right)$$

for k=1 and k=3, and (odd r, odd s) and (even r, even s).

21. A digital image processing apparatus comprising:
   a processor; and
   the one or more computer-readable media as recited in claim 16, the processor being configured to execute the one or more computer-readable instructions.

22. The apparatus of claim 21, wherein the apparatus comprises a digital camera.

23. A digital image processing apparatus comprising:
   a calculation module configured to calculate directional color correlation signals, global gains, and orientations of edges in a CFA input image having a Bayer pattern with GRGR phase in odd rows and BGBG phase in even rows;
   a luminance component demosaicking module configured to demosaick missing G components in CFA R and B locations along edges in the input image;
   a chrominance component white-balancing module configured to white-balance the CFA R and B components using the demosaicked G components, the CFA R and B components, and white-balancing gains expressed as a function of the global gains and local gains calculated directly from a pixel under consideration;
   a chrominance-chrominance component demosaicking module configured to demosaick missing R components in CFA B locations in the input image and missing B components in CFA R locations in the input image using the white-balanced R and B components and the demosaicked G components; and
   a chrominance-luminance component demosaicking module configured to demosaick missing R and B components in CFA G locations along edges in the input image using demosaicked R and B components and the CFA G components,
   wherein the calculation, luminance component demosaicking, chrominance component white-balancing, chrominance-chrominance component demosaicking, and chrominance-luminance component demosaicking modules are configured to transform the CFA input image having only one of an R, G, or B component in each pixel into a full-color white-balanced output image having an R, G, and B component in each pixel.

24. The apparatus of claim 23, wherein the apparatus comprises a digital camera.

* * * * *

UNITED STATES PATENT AND TRADEMARK OFFICE
CERTIFICATE OF CORRECTION

PATENT NO. : 8,035,698 B2
APPLICATION NO. : 12/357134
DATED : October 11, 2011
INVENTOR(S) : Rastislav Lukac It is certified that error appears in the above-identified patent and that said Letters Patent is hereby corrected as shown below:

Column 11,

Line 4, please change "$\Lambda^{1}$" to -- $\Lambda^{-1}$ --

Line 5, please change "$\Phi^{1}$" to -- $\Phi^{-1}$ --

Line 46, please change " $x_{(r,s)3} = z_{(r,s)}(w_1 x_{(r,s)2} / z_{(r,s)} + w_2 \overline{G} / \overline{R})/(w_1 + w_2)$ " to -- $x_{(r,s)3} = z_{(r,s)}(w_1 x_{(r,s)2} / z_{(r,s)} + w_2 \overline{G} / \overline{B})/(w_1 + w_2)$ --

Column 13,

Line 2, please insert -- $x$ -- before "is the output image with pixels $x_{(r,s)}$,"

Line 6, please change "$\Phi^{-}$" to -- $\Phi^{-1}$ --

Line 48, please change " $x_{(r,s)3} = z_{(r,s)}(w_1 x_{(r,s)2} / z_{(r,s)} + w_2 \overline{G} / \overline{R})/(w_1 + w_2)$ " to -- $x_{(r,s)3} = z_{(r,s)}(w_1 x_{(r,s)2} / z_{(r,s)} + w_2 \overline{G} / \overline{B})/(w_1 + w_2)$ --

Column 14,

Line 67, please change "$\Lambda^{1}$" to -- $\Lambda^{-1}$ --

Column 15,

Line 1, please change "$\Phi^{1}$" to -- $\Phi^{-1}$ --.

Signed and Sealed this
Sixth Day of December, 2011

David J. Kappos
*Director of the United States Patent and Trademark Office*